United States Patent [19]

Heinz et al.

[11] 4,003,641

[45] Jan. 18, 1977

[54] LOW DISTORTION HIGH ENERGY LASER MIRROR

[75] Inventors: Theodore A. Heinz, Moorpark, Calif.; Charlton Dunn, III, Berwyn, Pa.

[73] Assignee: The United States of America as represented by the Secretary of the Navy, Washington, D.C.

[22] Filed: July 25, 1975

[21] Appl. No.: 598,978

[52] U.S. Cl. .............................. 350/310; 350/288
[51] Int. Cl.² .......................................... G02B 5/08
[58] Field of Search ........................... 350/310, 288

[56] References Cited
UNITED STATES PATENTS

| 3,708,223 | 2/1973 | Sorensen et al. ............... 350/310 |
| 3,884,558 | 5/1975 | Dunn, III et al. ............... 350/310 |

*Primary Examiner*—John K. Corbin
*Assistant Examiner*—Jon W. Henry
*Attorney, Agent, or Firm*—R. S. Sciascia; L. I. Shrago; C. E. Vautrain, Jr.

[57] ABSTRACT

A high energy laser mirror formed from a single block of nickel and having a secondary coolant circuit for promoting low distortion is provided. Parallel slots of alternating and selected depth are machined in the block and connected to manifolds drilled so as to direct flow of coolant in opposite direction in adjacent slots. The ends and tops of the slots are closed by electrodeposition of nickel, completing a structure which is thermally stable at levels of operation requiring the absorption of several kilowatts of power.

6 Claims, 10 Drawing Figures

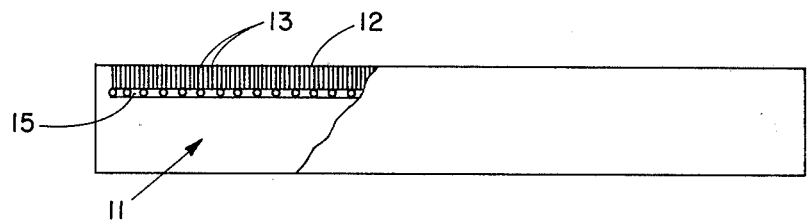
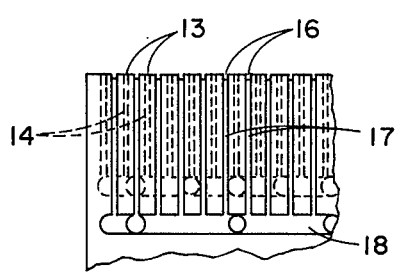
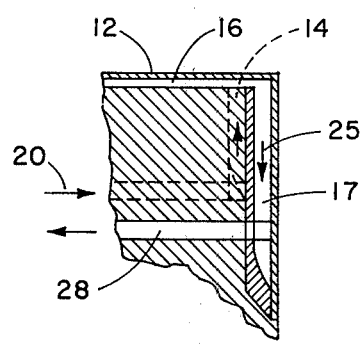
Fig. 2
Fig. 3
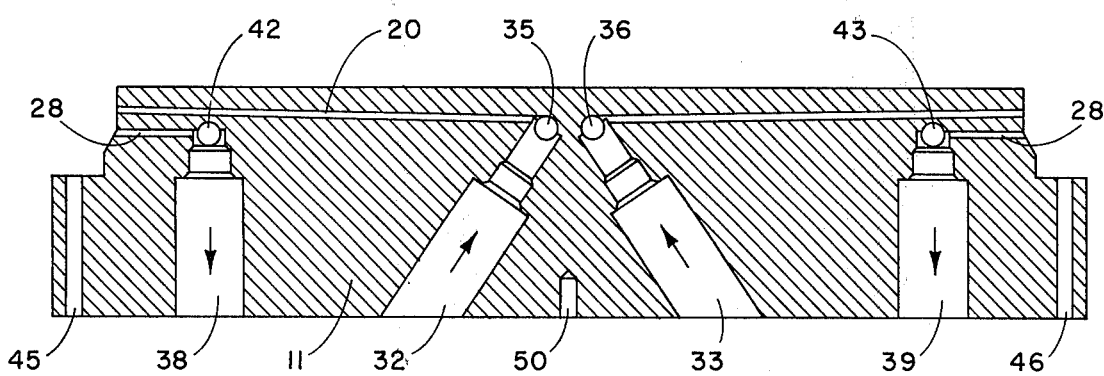
Fig. 4

LOW DISTORTION HIGH ENERGY LASER MIRROR

The present invention concerns optical mirrors and, more particularly, an optical mirror which is simple to construct and provides a low distortion surface while absorbing several kilowatts of power.

Optical mirrors are required in laser systems in which, as lasers progressively increase in power, higher and higher heat fluxes exist at the mirror's optically reflective surface. In view of the high heat fluxes, thermal distortions are inherent in most mirror designs and necessarily require special features to remove or minimize them. Surface flatness in laser cavity mirrors is often required to be within 1/100 of the wavelengths occuring in the cavity and from these circumstances, deviations from precise flatness may represent less than 10/1,000,000,000 of an inch. The heat flux at the reflective surface of laser cavity mirrors varies from 10 to 100 watts/cm$^2$ and higher for more recent lasers so that efficient and effective cooling of these mirrors is essential in order to maintain as precisely as possible the surface flatness of the mirrors. Thermal distortions which arise from uneven cooling of the mirror substrate thus must be reduced to an absolute minimum in order to achieve the fineness of reflective surface required.

Prior coolant laser cavity mirrors have attempted to meet the foregoing requirements by providing a plurality of fluid flow passages immediately beneath the reflective surface and inducing flow in these passages, and in some instances counter flow in adjacent passages, through curved channels in alternate plates of a composite mirror structure or through substantially rectangular passages of minor depth at the mirror face. The present invention provides a structurally simple mirror which has a superior coolant flow circuit when compared to prior devices and is capable of providing the required absorption at several kilowatts of laser operating power.

Accordingly, it is an object of the present invention to provide a high energy laser mirror which may be formed from a single block of metal.

Another object of the present invention is to provide a laser mirror which is capable of absorbing several kilowatts of power with a minimum distortion of the reflective surface and the mirror substrate.

A further object of this invention is to provide a laser mirror for use in the operation of a continuous high-power laser which includes a secondary coolant circuit to remove heat leaking through the face circuit of the mirror without allowing the back of the mirror to be warmed.

Other objects, advantages and novel features of the invention will become apparent from the following detailed description thereof when considered in conjunction with the accompanying drawings in which like numerals represent like parts thoughout and wherein:

FIG. 1 is a partly cut away side elevation schematic of one embodiment of the combined mirror and mirror substrate of the present invention;

FIG. 2 is an enlarged view partly cut away showing transverse coolant passages across the face of the substrate and connecting side slots in greater detail;

FIG. 3 is a sectional view showing the arrangement for providing coolant flow in opposite directions in adjacent passages;

FIG. 4 is an enlarged cross section of the mirror substrate of FIG. 1 showing typical inlet and outlet coolant ports and passages;

In general, the present invention provides efficient cooling of an optical mirror surface for an easily manufactured substrate in which coolant flows in opposite directions in a plurality of adjacent face coolant passages. Two centrally drilled manifolds distribute coolant along the entire length of the mirror, and coolant flow is directed to the outer edges of the mirror through a series of drilled passages to machined slots of the sides of the mirror substrate. Alternate transverse face slots are connected to separate manifolds so that coolant flow in one slot is opposed to coolant flow in the adjacent slots. The substrate is formed of a single block of nickel by machining slots and grooves in alternate layers of the electroformed nickel block. The ends of the slots are closed by depositing additional electroformed nickel and the surface is completed also by a deposit of electroformed nickel.

Figure 5:
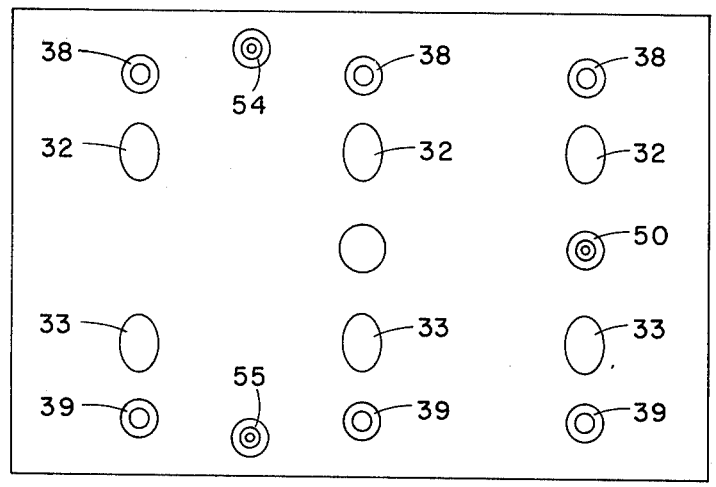
FIG. 5 is a bottom view of the mirror substrate of FIG. 1 showing the positions of inlet and outlet coolant ports.

Referring to FIG. 1, a side elevation of a mirror substrate 11 having a thin electroformed mirror surface 12 is shown partly cut away to illustrate a plurality of transverse surface slots 13 that are connected to a plurality of individual side slots 14 which terminate in a longitudinal slot 15. In FIG. 2, an enlarged side elevation of the upper left corner of the substrate of FIG. 1 is presented showing the manner in which alternate slots are formed to provide counter flow in adjacent slots. Side inlet slots 14 are hidden from view while alternating outlet slots 16 and connecting side slots 17 are shown open to view, terminating in a longitudinal slot 18. FIG. 3 illustrates the path of coolant flow to the surface slots, with inlet coolant indicated by arrow 20 flowing through a passage 21 which is one of a plurality of such drilled passages, through side slot 14, to surface slot 13, not seen in this view, and across the mirror substrate surface. Movement of outlet coolant in the next adjacent slot is indicated in direction by arrow 25 and such flow proceeds through outlet surface slot 13, down side slot 17 and across the mirror substrate remote from its reflective surface 12 through a drilled passage 28 which is one of a plurality of such passages to a coolant outlet manifold and coolant outlets not shown in this view. In FIG. 4 an enlarged cross section of mirror substrate 11 is shown in the stage of construction before surface slots 13 and side slots 14 and 17 have been made. The mirror block is prepared by drilling a plurality of inlet ports 32 and 33, a plurality of inlet manifold passages 35 and 36, a plurality of outlet ports 38 and 39 and a plurality of outlet manifolds 42 and 43. Tooling holes 45 and 46 also are shown as well as a threaded opening 50 for mounting the mirror substrate. The inlet and outlet ports are shown in preferred positions in the bottom view of the substrate presented in FIG. 5 in relation to the desired coolant flow rate. Supply and discharge fittings are attached respectively to inlet ports 32 and 33 and outlet ports 38 and 39. At least three mounting points 50, 54, and 55 are provided for selectively positioning and securing the substrate.

Figure 6:
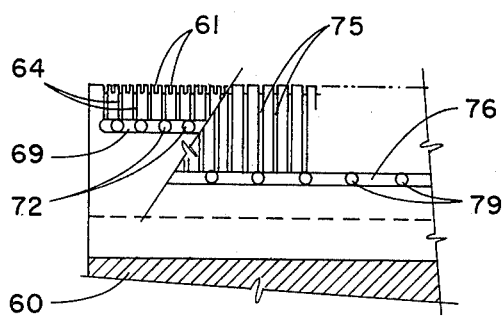
FIG. 6 is a side view partly cut away of a mirror substrate showing stages in the construction of the coolant passages.

FIG. 6 shows a mirror substrate 60 partly cut away to illustrate the manner in which the substrate is made. Initially, a plurality of slots 61 are machined across the entire width of the substrate. Next, a plurality of vertical or side slots 64 are made at the ends of alternate ones of surface slots 61. Side slots 64 are interconnected by a longitudinal header slot 69 which also is machined in substrate 60. A plurality of passages 72 are then drilled into the substrate along slot 69 corresponding to passages 20 shown in FIG. 4. These passages extend inward from each side of the block, noting that FIG. 6 shows only one side of the block, to the mid portion and communicate with a longitudinal manifold corresponding to manifold 35 in FIG. 4. After forming these slots and passages, the openings are filled preferably with wax and a layer of nickel having a thickness on the order of ¼ inch is electrodeposited on the side of the block to close off the ends of the slots and passages. Next, the surface slots 61 not having connecting side slots are extended through the electroformed nickel layer and a plurality of outlet vertical slots 75 are machined in the electroformed nickel at the ends of the slots. An outlet longitudinal header 76 also is machined in the electroformed nickel and a plurality of outlet passages 79 are drilled to provide communication with an outlet manifold in the block similar to manifold 42 in FIG. 4. These outlet slots and the manifold are filled preferably with wax and another layer of nickel substantially 0.040 thick is electrodeposited closing the slots and finishing the side of the block. On the opposite side of the block to that shown in FIG. 6, the converse of these steps is performed. That is, surface slots 61 which terminate in outlet vertical slots 75 are machined as inlet slots of the same length as slots 64 in FIG. 6, a longitudinal header slot is also machined in the electroformed nickel to connect these inlet slots, and a plurality of passages are drilled in this inlet slot communicating with an inlet manifold in the central portion of the block corresponding to manifold 36 in FIG. 5. Thereafter, the slots are filled preferably with wax and electroformed over to a thickness on the order of ¼ inch. The remaining slots 61 are extended and outlet vertical slots are now machined in the electroformed layer at the ends of these surface slots. An outlet header slot corresponding to slot 76 is machined in the nickel connecting the outlet slots, a plurality of passages are drilled communicating between the header slot and an outlet manifold corresponding to manifold 43 in FIG. 4, and the side is closed by electrodeposited nickel.

Figure 7:
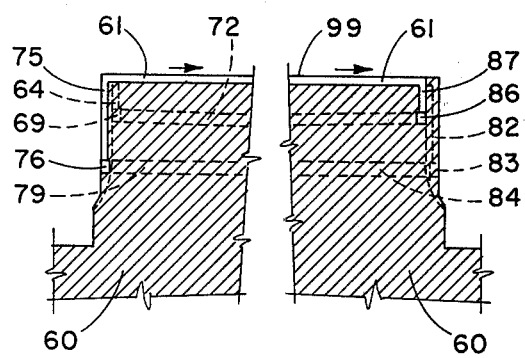
FIG. 7 is a sectional view of the embodiment of FIG. 6 showing a passage for coolant flow in one direction.
Figure 8:
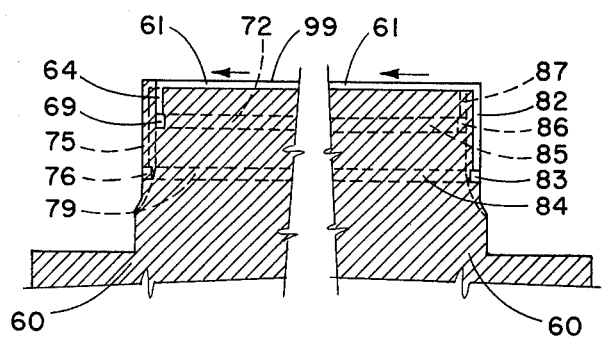
FIG. 8 is a sectional view of the embodiment of FIG. 6 showing coolant flow in the opposite direction.

FIGS. 7 and 8 are sectional views of the embodiment of FIG. 6 taken along successive surface slots 61 to illustrate in greater detail the coolant passages in substrate 60. In FIG. 7, a coolant circuit is shown in solid line which comprises inlet passage 72, vertical slot 64, surface slot 61, and a vertical outlet slot 82 which terminates in an outlet header 83 which in turn is connected to an internally drilled outlet manifold, not shown, by a plurality of drilled passages 84. In FIG. 8, the next adjacent coolant circuit having opposite flow through another slot 61 is shown which includes an inlet manifold, not shown, a plurality of inlet passages 85, an inlet header 86, a vertical inlet slot 87, surface slot 61, vertical outlet slot 75, and outlet header 76.

Figure 9:
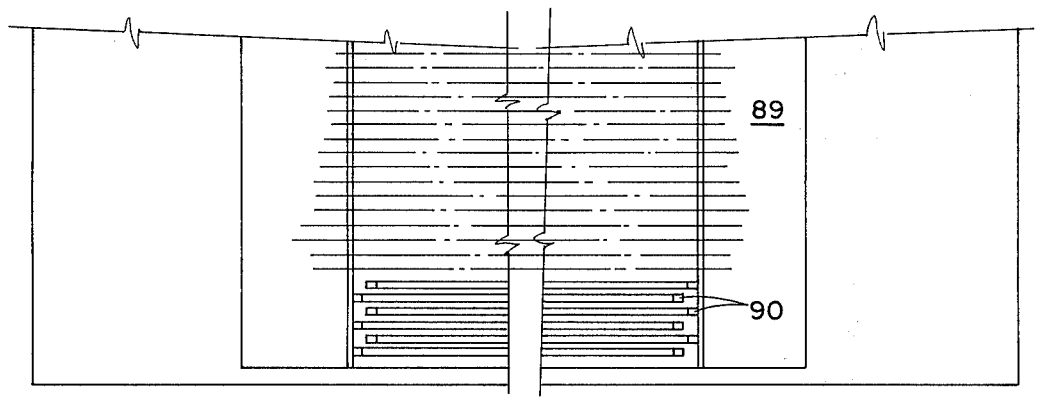
FIG. 9 is a plan view of a portion of the mirror substrate of FIG. 6.
Figure 10:
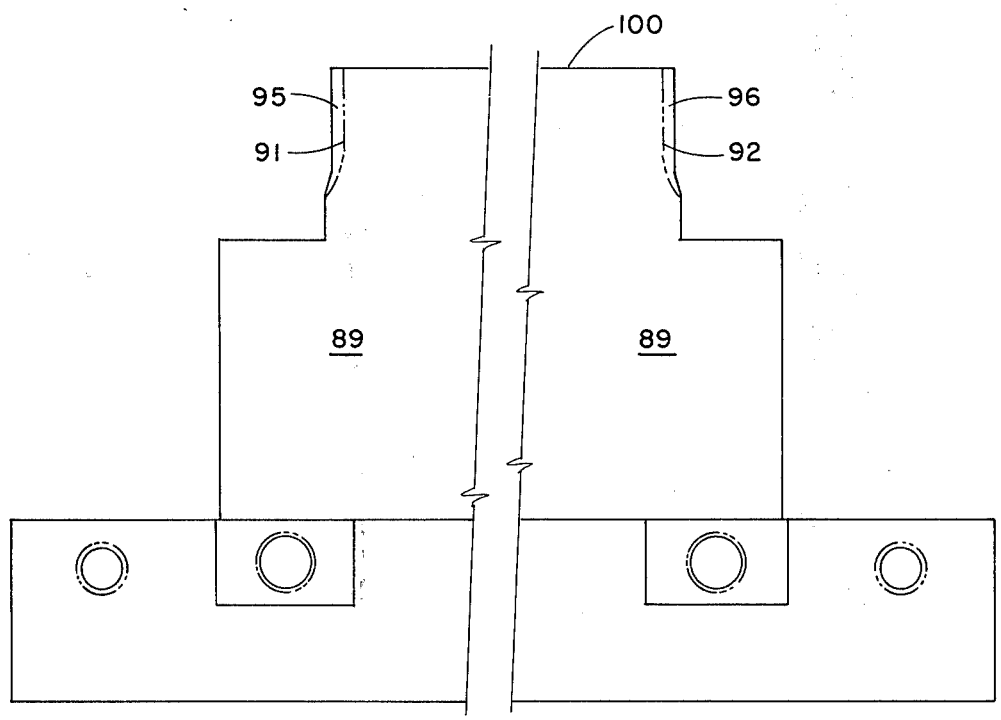
FIG. 10 is a side elevation of the mirror substrate of FIG. 9.

FIGS. 9 and 10 present an overall view of a completed embodiment wherein FIG. 9 is a plan view of a mirror substrate 89 showing opposite flow coolant conducting slots 90 which are to be covered preferably by an electrodeposited mirror surface preferably of nickel and substantially 0.020 inch thick. In FIG. 10, the end of substrate 89 is shown to emphasize the manner in which the side walls are built up to accommodate the vertical inlet and outlet slots. The original shape of the block is shown at 91 and 92 and the electroformed layers on either side, indicated at 95 and 96, complete an integral block having the desired passages. When a block has been completed to this stage, it is heated sufficiently to melt and drain off the wax used to fill the exposed passages therein. The final step in construction of the mirror is to electrodeposit a very thin mirror face on top of the ridges which define slots 61. These mirror faces are 12 in FIGS. 1 and 2, 99 in FIGS. 7 and 8, and 100 in FIG. 10.

The operation of the device, which has been partially covered during the description of the various figures, can be completed by relating that incoming coolant is distributed along the length of the mirror by two centrally located drilled passages such as 35 and 36 in FIG. 4. These drilled passages are fed from preferably six inlet ports such as 32 and 33 in FIGS. 4 and 5. Coolant flows to the outer edges of the mirror through the plurality of drilled passages identified as 20 in FIGS. 4 and 72 and 85 in FIGS. 7 and 8, respectively. These passages feed common headers 69 in FIG. 7 and 86 in FIG. 8 which in turn supply coolant to surface slots 61 via vertical inlet slots 64 and 87. After traversing surface slots 61 in opposite directions in alternate ones of these slots, coolant is directed down either side of the substrate through slots 75 and 82 to common outlet headers 76 and 83. From these headers, coolant flows through outlet passages 79 and 84 to drilled manifolds near the sides of the substrate such as manifolds 42 and 43 in FIG. 4 and from these manifolds through outlet ports such as 38 and 39 in FIG. 4.

In the counter flow circuit provided, identical inlet and outlet connecting slots as well as headers are formed on each side of the mirror substrate. These are formed preferably by machining in the substrate itself initially and then in additional layers of electroformed nickel, with the sub-layer machined, waxed and closed out by a deposited layer of electroformed nickel prior to machining the final layer. The face of the mirror is deposited after all of the coolant slots and passages have been formed. The headers, the interior passages and the manifolds may be formed at any selected distance below the mirror surface and since they are present in large number, they provide effective cooling of the back of the mirror and in effect form a secondary coolant circuit for removing heat leaked through the face circuit. This interior cooling prevents the back of the mirror from being warmed any appreciable amount and serves to further reduce surface distortion.

There is thus provided a thermally stable mirror substrate structure which may be cooled using water as the coolant and which affords significant power absorption. The simplicity of construction and fabrication of the substrate of the present invention results in low cost substrates compared to large, brazed structures which require considerably more as well as expensive tooling and facilities compared to the electroformed substrates of the invention. Coolant flow in this substrate occurs in a counter flow pattern at maximum velocity across the substrate adjacent the mirror surface and in a very considerable velocity at any desired depth within the substrate where the passages connecting the headers and the inlet and outlet manifolds may be placed. Further cooling efficiencies may be obtained by arranging the inlet and outlet manifolds in any of a variety of positions within the substrate so long as they may be connected by drilled or other readily formed passages directed to the corresponding headers on the sides of the substrate.

Obviously many modifications and variations of the present invention are possible in the light of the above teachings. For example, the substrate may be made of other thermally conductive substances than electrodeposited nickel and the slots and passages may be replaced by other conventionally formed passages which are susceptible to standard machining techniques.

What is claimed is:

1. A mirror having a cooled face for high energy reflection comprising:
    a mirror substrate in substantially rectangular block form;
    a plurality of coolant slots disposed in parallel relationship in the surface of said substrate designated as the major surface;
    a common inlet conduit on one side of said substrate at one of the ends of said slots and means connecting alternate ones of said slots to said conduit;
    a common outlet conduit on said one side of said substrate and means connecting the other ones of said slots to said outlet conduit;
    an outlet conduit on the other side of said substrate at the other ends of said slots and means connecting said alternate ones of said slots thereto;
    an inlet conduit on said other side of said substrate and means connecting the remaining ones of said slots to said inlet conduit;
    inlet and outlet coolant ports in the surface of said substrate opposite said slots;
    at least two inlet manifolds in said substrate and means connecting said inlet manifolds to respective ones of said inlet conduits;
    at least two outlet manifolds in said block and means connecting said outlet manifolds to respective ones of said outlet conduits;
    means in said block connecting said inlet and outlet manifolds to respective ones of said inlet and outlet ports;
    a supply of coolant and means connecting said supply to said inlet ports; and
    a mirror surface formed across and made integral with said major surface of said substrate,
        whereby said mirror surface may be cooled by counter flow of coolant in adjacent slots across said major surface thereof and said substrate may be cooled by counter flow of coolant through said means connecting said conduits, manifolds and ports therein.

2. The mirror as defined in claim 1 wherein said inlet manifolds are disposed transverse to said slots and are positioned along the center portion of said substrate to lengthen the coolant paths through said substrate, and said outlet manifolds are positioned adjacent and parallel to the respective sides of said substrate to shorten warmed coolant paths in said substrate.

3. The mirror as defined in claim 2 wherein said inlet ports and said means connecting said inlet manifolds to said inlet conduits meet at an acute angle to promote more uniform distribution of coolant and lengthen cooling paths,
    said outlet ports and said means connecting said outlet manifolds to said outlet ports meeting orthogonally to accelerate discharge of coolant and shorten paths for warmed coolant.

4. The mirror as defined in claim 3 wherein said coolant slots and said means connecting said coolant slots to said inlet and outlet conduits are, respectively, machined surface and side grooves in said substrate,
    said side grooves connected to alternate ones of surface grooves first formed in said substrate;
    means bonded to said sides of said substrate closing said first formed side grooves and said conduits connected thereto;
    said other ones of said side grooves machined in said means bonded to said sides of said substrate; and
    means closing said other ones of said side grooves and said conduits connected thereto.

5. The mirror as defined in claim 4 wherein said inlet and outlet conduits are machined in said sides of said substrate,
    said means connecting said conduits and said manifolds being passages drilled in said substrate.

6. A mirror having a cooled face for use in high energy reflection comprising:
    a mirror substrate in substantially rectangular block form;
    a plurality of substantially identical parallel slots formed in and across a major surface of said substrate;
    an inlet header and an outlet header formed in each of the sides of said substrate and displaced both horizontally and vertically from one another;
    a first plurality of conduits connecting alternate ones of said slots with said inlet header on one side of the substrate and connecting the remaining slots with said outlet header on said one side;
    a second plurality of conduits on the side opposite said first plurality of conduits connecting said alternate ones of said slots with said outlet header on said other side and the remaining slots with said inlet header on said other side;
    a plurality of inlet and outlet ports in the surface of said substrate opposite said major surface thereof;
    at least a pair of inlet manifolds formed in said substrate intermediate said opposite surface and said major surface thereof and means interconnecting said manifolds and said inlet ports;
    at least a pair of outlet manifolds formed in said substrate intermediate said opposite surface and said major surface thereof and means interconnecting said outlet ports and said outlet manifolds;
    passages in said substrate connecting respective inlet and outlet manifolds;
    a mirror surface formed across said major surface of said substrate; and
    a supply of coolant and means connecting said supply to said inlet ports,
        whereby said mirror surface may be cooled by counter flow of coolant in said slots across said major surface thereof and said substrate may be cooled by counter flow of coolant through passages therein.

* * * * *